United States Patent
Rausch et al.

(10) Patent No.: US 12,128,749 B2
(45) Date of Patent: Oct. 29, 2024

(54) ENERGY STORE HOUSING ASSEMBLY FOR A MOTOR VEHICLE

(71) Applicant: AUDI AG, Ingolstadt (DE)

(72) Inventors: Julius Rausch, Heilbronn (DE); Felix Diebold, Neckarsulm (DE); Martin Kothmann, Neckarsulm (DE)

(73) Assignee: AUDI AG, Ingolstadt (DE)

( * ) Notice: Subject to any disclaimer, the term of this patent is extended or adjusted under 35 U.S.C. 154(b) by 305 days.

(21) Appl. No.: 17/609,293

(22) PCT Filed: Apr. 22, 2020

(86) PCT No.: PCT/EP2020/061116
§ 371 (c)(1),
(2) Date: Nov. 5, 2021

(87) PCT Pub. No.: WO2020/224954
PCT Pub. Date: Nov. 12, 2020

(65) Prior Publication Data
US 2022/0212530 A1    Jul. 7, 2022

(30) Foreign Application Priority Data

May 8, 2019 (DE) .................. 10 2019 206 646.1

(51) Int. Cl.
*B60K 1/04* (2019.01)
*B60L 50/60* (2019.01)
*B60L 58/26* (2019.01)

(52) U.S. Cl.
CPC ............... *B60K 1/04* (2013.01); *B60L 50/66* (2019.02); *B60L 58/26* (2019.02); *B60K 2001/0438* (2013.01)

(58) Field of Classification Search
CPC ... B60K 1/04; B60K 2001/0438; B60L 50/66; B60L 58/26

(Continued)

(56) References Cited

U.S. PATENT DOCUMENTS

| | | | | |
|---|---|---|---|---|
| 5,555,950 A | * | 9/1996 | Harada | H01M 50/209 180/68.5 |
| 6,843,525 B2 | * | 1/2005 | Preisler | B62D 25/2054 296/184.1 |
| 7,614,469 B2 | * | 11/2009 | Kumar | H01M 50/204 180/68.5 |
| 8,939,246 B2 | * | 1/2015 | Yamaguchi | B60L 50/66 180/311 |

(Continued)

FOREIGN PATENT DOCUMENTS

| | | |
|---|---|---|
| CN | 102347461 A | 2/2012 |
| CN | 107851863 A | 3/2018 |

(Continued)

OTHER PUBLICATIONS

International Search Report of the International Searching Authority directed to related International Patent Application No. PCT/EP2020/061116, mailed Aug. 3, 2020, with attached English-language translation; 6 pages.

(Continued)

*Primary Examiner* — Hau V Phan
(74) *Attorney, Agent, or Firm* — Sterne, Kessler, Goldstein & Fox P.L.L.C.

(57) ABSTRACT

The present disclosure relates to an energy store housing assembly for a motor vehicle. The energy store housing assembly includes an energy store housing and an underride guard coupled to a bottom side of the energy store housing. The underride guard includes a sandwich arrangement, which includes an upper cover plate disposed on the top side of the sandwich arrangement facing the energy store housing, a lower cover plate disposed on the bottom side of the sandwich arrangement, and a filling material disposed between the upper cover plate and the lower cover plate. The underride guard includes a plurality of ribs extending along the top side of the sandwich arrangement.

15 Claims, 2 Drawing Sheets

(58) Field of Classification Search
USPC .................................................. 180/68.5
See application file for complete search history.

(56) References Cited

U.S. PATENT DOCUMENTS

| | | | |
|---|---|---|---|
| 9,016,765 B1* | 4/2015 | Rawlinson | B60L 50/66 |
| | | | 296/187.07 |
| 9,758,028 B2* | 9/2017 | Ikeda | B62D 29/043 |
| 10,099,546 B2* | 10/2018 | Hara | B60K 1/04 |
| 10,112,470 B2* | 10/2018 | Hamilton | B62D 25/20 |
| 11,145,927 B2 | 10/2021 | Haeusler et al. | |
| 2012/0103714 A1 | 5/2012 | Choi et al. | |
| 2016/0236713 A1* | 8/2016 | Sakaguchi | B62D 25/2036 |
| 2017/0025655 A1* | 1/2017 | Klimek | H01M 50/24 |
| 2017/0305250 A1* | 10/2017 | Hara | H01M 50/204 |
| 2018/0183116 A1* | 6/2018 | Hitz | H01M 10/625 |
| 2018/0312199 A1* | 11/2018 | Kawase | B60K 1/04 |
| 2018/0337377 A1* | 11/2018 | Stephens | H01M 50/224 |
| 2019/0168624 A1 | 6/2019 | Peer et al. | |

FOREIGN PATENT DOCUMENTS

| | | | |
|---|---|---|---|
| DE | 102011005403 A1 | | 6/2012 |
| DE | 102017000265 A1 | | 7/2017 |
| DE | 102016103411 | † | 8/2017 |
| DE | 102016103411 A1 | | 8/2017 |
| DE | 102016215285 A1 | | 2/2018 |
| DE | 102017103654 A1 | | 8/2018 |
| DE | 102018215036 A1 | | 3/2019 |
| DE | 102017009640 A1 | | 4/2019 |
| WO | WO 2014/188259 A1 | | 11/2014 |
| WO | WO 2015/077000 A1 | | 5/2015 |
| WO | WO 2018/149762 A1 | | 8/2018 |
| WO | WO2018149762 | † | 8/2018 |
| WO | WO2018153781 | † | 8/2018 |
| WO | WO 2018/202813 A2 | | 11/2018 |

OTHER PUBLICATIONS

International Preliminary Report on Patentability directed to related International Patent Application No. PCT/EP2020/061116, issued Nov. 2, 2021, with attached English-language translation; 13 pages.
Written Opinion of the International Searching Authority directed to related International Patent Application No. PCT/EP2020/061116, completed Aug. 3, 2020, with attached English-language translation; 12 pages.

\* cited by examiner
† cited by third party

ENERGY STORE HOUSING ASSEMBLY FOR A MOTOR VEHICLE

TECHNICAL FIELD

The invention relates to an energy store housing assembly for a motor vehicle, comprising an energy store housing and an underride guard fixed to the bottom side of the energy store housing. The invention further relates to an underride guard for an energy store housing assembly and to a motor vehicle.

BACKGROUND

Underride guards are typically monolithic or one-piece components, in particular made of metal or plastics material, whereby in electric or hybrid vehicles these are often fixed to an energy store housing of an underfloor battery. Underride guards are used to protect energy stores or HV modules accommodated in the energy store housing, in particular with regard to any mechanical loads in the event of accidents or the like. In particular, energy stores in the motor vehicle pose a high risk of fire in the event of damage, which is why they should be protected from mechanical loads and damage that may result therefrom. Underride guards are also used in motor vehicles in order to prevent, in the event of a collision with another road user, in particular with another motor vehicle or a pedestrian, said pedestrian from being overrun by the motor vehicle. Underride guards therefore serve to avoid potentially serious injuries to the other road user and/or damage to the motor vehicle.

SUMMARY OF INVENTION

The object on which the invention is based can be seen in specifying an improved concept for underride guard, in particular with regard to an improvement in the mechanical properties.

The object is achieved in an energy store housing assembly of the type mentioned in that the underride guard comprises a sandwich arrangement having an upper cover plate on the top side thereof facing the energy store housing and a lower cover plate on the bottom side thereof, wherein a filling material is arranged between the upper cover plate and the lower cover plate and the top side of the sandwich arrangement is profiled by webs or ribs.

The energy store housing typically has a base plate or a housing base, to which preferably four side walls of the energy store housing adjoin, which side walls are typically perpendicular to the base plate and can be fixed to the base plate via screws or other suitable fixing means. At the top, the energy store housing is preferably closed by means of a housing cover which, like the base plate, is preferably screwed to the side walls. Energy stores or accumulators, which are used to store energy for powering the drivetrain of the motor vehicle designed for example as an electric or hybrid vehicle, are accommodated within the energy store housing.

The underride guard is formed in at least three layers, the filling material being provided between the upper cover plate and the lower cover plate, which preferably delimit the underride guard towards the outside. The webs or ribs represent, as it were, reinforced elongated regions of the underride guard, thus ultimately increasing the flexural rigidity of the underride guard. This optimization of the topology of the underride guard or the energy store housing assembly results in improved energy absorption in the event of sudden loads, in particular in crash situations or accidents.

Specifically, the webs or ribs can be implemented by a corresponding geometric shape of the upper cover plate, it being possible for this shape and the geometric shape of the filling material to be adapted to one another. For example, the upper cover plate can have, at least in portions, for example elongated or channel-like bulges which face the energy store housing or, more precisely, the base plate of the energy store housing and which form the webs or ribs. The lower cover plate is preferably flat in order to optimize the aerodynamic properties of the energy store housing assembly or of the associated motor vehicle, in particular in order to reduce the $c_w$ value.

The upper cover plate is particularly preferably provided as a one-piece workpiece, also with regard to the webs or ribs. Furthermore, the sandwich arrangement comprising the upper cover plate, the filling material and the lower cover plate can be provided as a machine-produced component, i.e. this component can be produced in a single step using appropriately shaped tools.

In the energy store housing assembly according to an embodiment of the invention, it can be provided that the underride guard is fixed in the region of the webs or ribs to at least one reinforcing element arranged within the energy store housing and intended to increase the mechanical stability of the energy store housing and/or to at least one side wall of the energy store housing. The topology of the energy store housing and the topology of the underride guard can therefore be adapted to one another in such a way that the underride guard is better supported on the carrier structure of the energy store housing.

In the event of a crash or in general when the underride guard is exposed to force, the forces acting are transmitted in this case from the underride guard as directly and efficiently as possible to the reinforcing element of the energy store housing, resulting in an optimized energy absorption of the energy store housing assembly. Such an advantageous transmission of forces is also brought about when the webs or ribs of the underride guard are fixed to the side wall of the energy store housing. An already existing structure is therefore functionally connected to the underride guard in such a way that this results in an improvement in the mechanical properties of the energy store housing assembly in a synergetic manner.

The at least one reinforcing element can be a carrier of the energy store housing that extends at least in portions along the base plate of the energy store housing, in particular extending between two opposite side walls of the energy store housing. The carrier, which can be a longitudinal and/or transverse carrier, for example, serves to increase the strength of the energy store housing and thus protect the energy stores accommodated in the housing from mechanical loads and damage that may result from this in the event of a crash or accident.

The carrier preferably extends over the entire height of the energy store housing, for example, from the base plate to the housing cover, and is fixed thereto. Furthermore, the carrier preferably extends completely between two opposite side walls of the energy store housing and is optionally also fixed thereto. The carrier can have a rectangular cross section with a solid or hollow profile. Furthermore, the carrier can consist of metal, in particular of steel or aluminum, alternatively also of plastics material or other suitable materials. A plurality of carriers is preferably provided, which form rectangular or cuboid receiving regions for the energy stores accommodated in the energy store housing.

Each web or each rib can be fixed to a carrier of the energy store housing which carrier is different in each case. The longitudinal axes of the webs or ribs preferably run substantially parallel to the longitudinal axes of the carriers when these are fixed to one another.

In the case of the energy store housing assembly according to an embodiment of the invention, it can be provided that a plurality of screws, sockets, and/or rivets penetrate the sandwich arrangement and the or a base plate of the energy store housing and are fixed to the carrier. The carrier can have bores with corresponding threads into which the screws engage in the fixed state. The underride guard can therefore ultimately only be fixed to the carriers by means of the screws, bushings and/or rivets. The lower cover plate can have countersunk holes for accommodating the heads of the screws and/or rivets.

It is preferably provided that, between the underride guard and the energy store housing, at least one cooling device is arranged in thermal contact with at least one energy store accommodated in the energy store housing and comprises in particular at least one cooling plate. The energy stores typically generate heat that has to be dissipated, in particular when charging or driving the motor vehicle. For this purpose, the cooling device can be in thermal contact with the base plate of the energy store housing, the base plate typically being made of metal and thus having good thermal conductivity, the base plate in turn being in thermal contact with the energy store. The underride guard of the energy store housing assembly according to the invention also protects the cooling device, in the same way as the energy store, from damage in the event of a crash, especially since leakage of the possibly environmentally harmful cooling fluid should be avoided.

The cooling device can be arranged at a distance from the underride guard or the upper cover plate of the underride guard, an air cushion preferably being formed as thermal insulation between these components. This has the effect, in particular at high outside temperatures, that the cooling power provided by the cooling device is not unnecessarily released to the outside via the underride guard. For example, screw connections or the like can be provided for fixing the cooling plates to the energy store housing. The distance between the cooling plates and the sandwich arrangement can be equally constant, provided that the sandwich arrangement between the webs or ribs has a constant height in each case. Alternatively, it is possible that the sandwich arrangement is designed to be curved in the regions between two webs or ribs, i.e. has a bridge-like structure in a sectional view.

The cooling device, in particular the at least one cooling plate, is preferably part of a cooling circuit or cooling system in which a cooling fluid circulates. For this purpose, the cooling device can be connected to cooling lines carrying the cooling fluid, wherein the underride guard can have corresponding recesses for the passage of the cooling lines. In this case, the cooling lines preferably run parallel to the underride guard or to the sandwich arrangement.

The sandwich arrangement can have at least two webs or ribs, wherein the cooling device is arranged between two webs or ribs and extends at least over half, preferably over two thirds, of the distance between the webs or ribs. In this case, the free installation space that is already present between two webs or ribs is used extremely efficiently. In addition, the cooling device or the cooling plates should be in thermal contact with the largest possible area of the energy store housing in order to ensure the most efficient heat flow possible between the energy store and the cooling device. In the event that more than two webs or ribs are provided, a cooling device can preferably be arranged in each case between two adjacent webs or ribs.

Furthermore, it can be provided for the energy store housing assembly according to an embodiment of the invention that the filling material is a thermal insulation material, in particular a filling foam. The filling material not only contributes to the improvement of the mechanical properties of the energy store housing assembly already explained, but also serves in a synergetic manner to dispense with specific further measures that cause thermal decoupling between the energy store housing and the underride guard. For example, insulation means or components arranged between these components and designed as separate components are no longer required in this embodiment. This is particularly advantageous at comparatively high outside temperatures, at which a heat transfer from the outside via the underride guard to the energy store housing should be kept as low as possible.

The filling material can, for example, be a plastics material, in particular a polyethylene terephthalate (PET), a polyurethane (PUR) or a polymethacrylimide (PMI) or the like. The filling material can be a molded component or it can be in the form of sheet material. The sheet material can be provided with a local overpressing impressed by the tool used to produce the filler, whereby, for example, recesses of the filling material for the screw heads of the cooling plates or the like are realized.

The upper cover plate and/or the lower cover plate can be made of a plastics material and/or can be fiber-reinforced. In contrast to, for example, metallic materials, plastics materials have a lower density, as a result of which a lighter construction of the energy store housing assembly can be realized. The energy store housing assembly can be mechanically reinforced even further by the fiber reinforcement.

Plastics materials can be provided as materials for the upper cover plate and/or the lower cover plate. In the event that thermoplastic plastics materials are used for this purpose, an injection molding process, back-molding of thermoplastic semi-finished products (organic sheets or the like), or extrusion of long-fiber-reinforced thermoplastics can be provided as the manufacturing process. The upper cover plate and/or the lower cover plate can also be made of a thermosetting plastics material, whereby wet pressing, an injection method, pultrusion, or extrusion of an SMC (sheet molding compound) can be provided as the production method.

The fibers can be, for example, glass fibers, carbon fibers, or natural fibers. The fibers can be provided as semi-finished textile products, in particular scrims, fabrics, fleeces, or in the form of sheet molding compounds. The fibers can be continuous or discontinuous fibers. The cover plates can also be reinforced with flat reinforcing elements, so-called patches. It is also conceivable that at least some of the fibers are aligned unidirectionally.

In the case of the energy store housing assembly, it can be provided that the filling material is only arranged in the region of the sandwich arrangement adjacent to the energy store housing between the upper cover plate and the lower cover plate, and otherwise, in particular in a region protruding laterally beyond the energy store housing, the upper cover plate and the lower cover plate are in direct contact with one another, or the sandwich arrangement only comprises the upper cover plate or the lower cover plate. The advantageous effects of the sandwich structure, in particular the improved power transmission or the thermal insulation, are mainly required in the contact region of the under ride guard with the battery housing. Outside this region, for economic reasons, in particular to save weight and material, the filling material can be omitted, in which case, in this region, the upper cover plate is preferably in direct contact with the lower cover plate and these are fixed to one another there. Alternatively, only the upper cover plate or the lower cover plate can be provided in the region protruding laterally beyond the energy store housing (i.e. in the region that represents a continuation of the sandwich plane), the end face of the other cover plate abutting the plane of the other cover plate in each case.

The invention further relates to an underride guard for an energy store housing assembly according to the above description, wherein, based on the state thereof fixed to an energy store housing, the underride guard comprises a sandwich arrangement having an upper cover plate on the top side thereof facing the energy store housing and a lower cover plate on the bottom side thereof, wherein a filling material is arranged between the upper cover plate and the lower cover plate and the top side of the sandwich arrangement is profiled by webs or ribs. All advantages and features relating to the energy store housing assembly can be applied to the underride guard and vice versa.

In particular, it can be provided that the filling material is a thermal insulation material, in particular a filling foam.

The upper cover plate and/or the lower cover plate can be made of a plastics material and/or can be fiber-reinforced.

In the underride guard according to an embodiment of the invention, it can be provided that the filling material is only arranged in the region of the sandwich arrangement adjacent to the energy store housing between the upper cover plate and the lower cover plate, and otherwise, in particular in a region protruding laterally beyond the energy store housing, the upper cover plate and the lower cover plate are in direct contact with one another, or the sandwich arrangement only comprises the upper cover plate or the lower cover plate.

An embodiment of the invention also relates to a motor vehicle, comprising an energy store housing assembly according to the description above. All advantages and features relating to the energy store housing assembly and the underride guard can be applied to the underride guard and vice versa.

BRIEF DESCRIPTION OF THE FIGURES

Further advantages and details of the invention shall become apparent from the embodiments described below and with reference to the drawings. Schematically, in the drawings.

DETAILED DESCRIPTION

Figure 1:
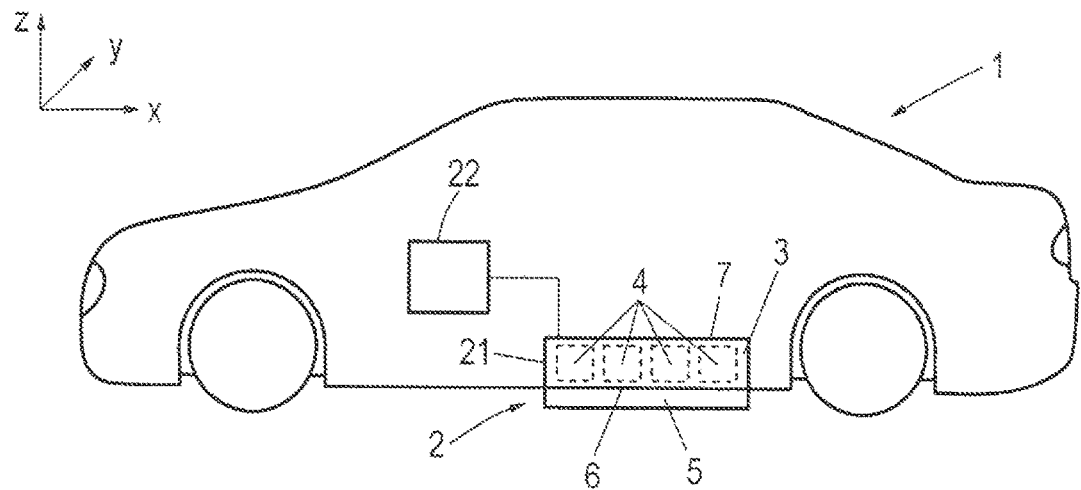
FIG. 1 is a side view of a motor vehicle according to an embodiment of the invention.

The motor vehicle 1 shown in FIG. 1 has an energy store housing assembly 2, comprising an energy store housing 3, a plurality of energy stores 4 accommodated in the energy store housing 3, and an underride guard 5 fixed to the bottom side of the energy store housing 3. The energy stores 4 accommodated in the interior of the energy store housing 3 are connected via electrical connection means to a drive motor 22 of the motor vehicle 1 designed as an electric motor. The coordinate system shown in FIG. 1 defines the x-axis as the vehicle's longitudinal axis, the y-axis as the vehicle's transverse axis, and the z-axis as the vehicle's vertical axis.

Figure 2:
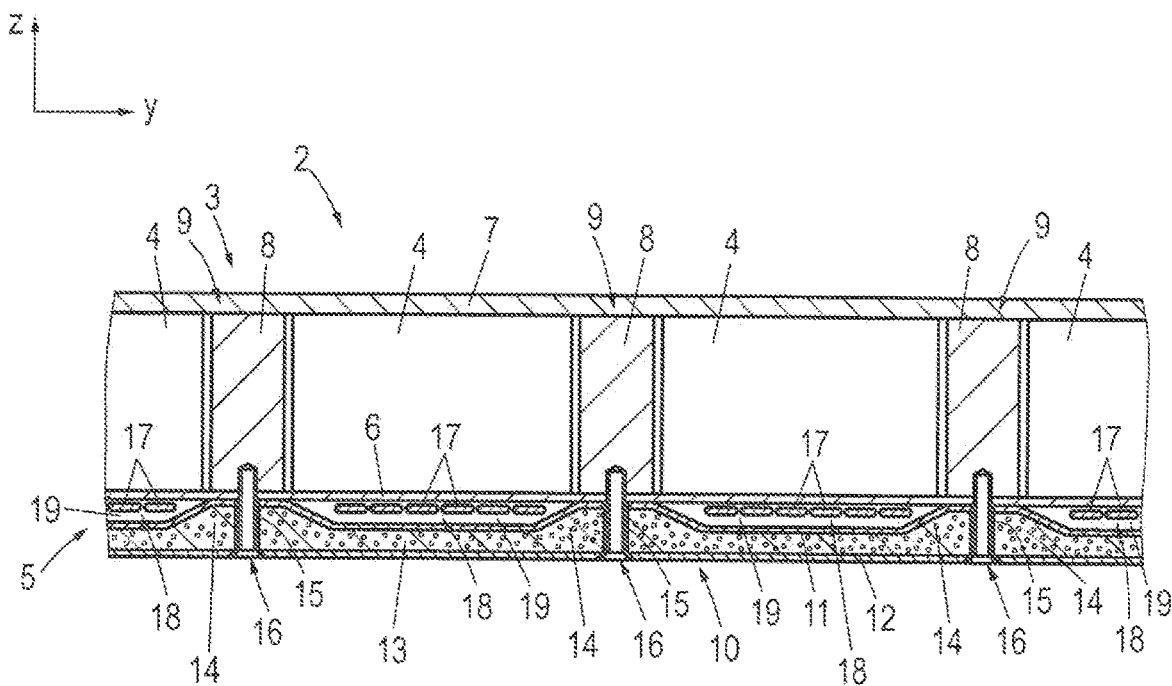
FIG. 2 is a sectional view of an energy store housing assembly according to an embodiment of the invention.

FIG. 2 shows a sectional view through the energy store housing assembly 2, the sectional plane running in the y-z plane. The energy store housing 3 comprises a housing base 6 on which four side walls 21 extend vertically upwards, i.e. in the z direction. The energy store housing 3 is closed by the housing cover 7 which, for this purpose, is screwed for example to the side walls 21 and to a plurality of reinforcing elements 9 of the energy store housing 3 designed as carriers 8. The carriers 8 are, for example, longitudinal carriers extending in the longitudinal direction of the vehicle, i.e. in the x direction, which carriers extend over the entire height of the energy store housing 3, i.e. between the housing base 6 and the housing cover 7, and between two opposite side walls 21 of the energy store housing 3. The carriers 8 are screwed to the housing base 6, the underride guard 5, which will be discussed in detail later, and to the housing cover 7. The carriers 8 form a cuboid receiving structure for the energy stores 4 which are inserted into the receiving compartments during assembly and are also screwed to the carriers 8. The mechanical strength of the energy store housing 3 is thus ultimately reinforced by the carrier 8.

Figure 3:
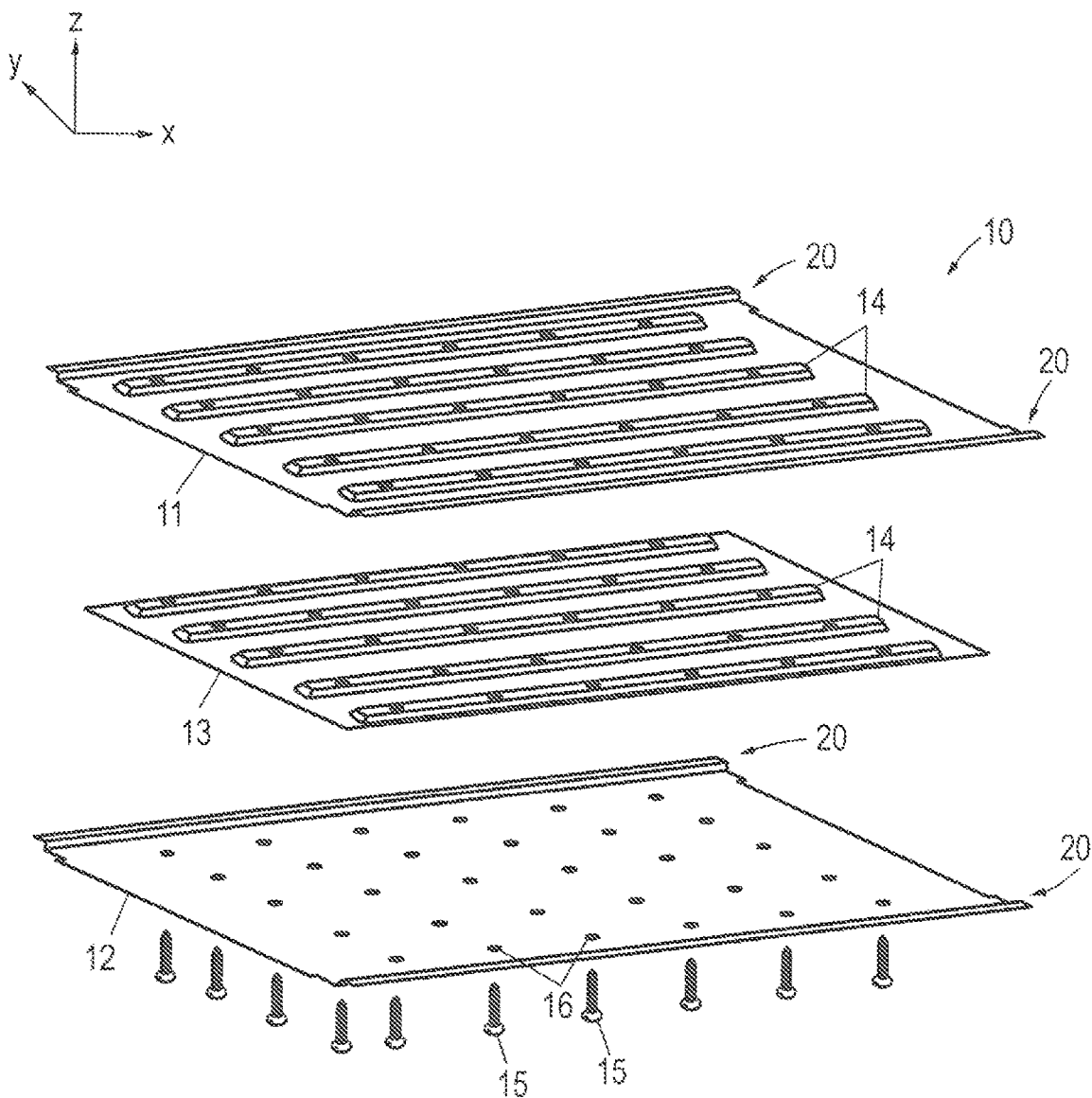
FIG. 3 is an exploded view of a sandwich arrangement of an underride guard according to an embodiment of the invention.

The underride guard 5 has a sandwich arrangement 10 with an upper cover plate 11 and a lower cover plate 12. The upper cover plate 11 is arranged on the side of the underride guard 5 facing the energy store housing 3 or the housing base 6, i.e. the top side. Between the upper cover plate 11 and the lower cover plate 12, a filling material 13, exemplarily designed as a thermal insulation material, in particular a filling foam, is arranged. Furthermore, the top side of the sandwich arrangement 10 has a profile formed via webs or ribs 14. The webs or ribs 14 run, in the same way as the carriers 8, for example in the longitudinal direction of the vehicle, i.e. in the x direction. The sandwich arrangement 10 therefore has a height in the region of the webs or ribs 14 that is greater in relation to the z direction than in the rest of the region. The channel-like geometric structure of the upper cover plate 11 thus realizes the webs or ribs 14 of the sandwich arrangement 10. The lower cover plate 12 is designed as a flat plate. An exploded view of the sandwich arrangement 10 is shown in FIG. 3.

The underride guard 5 serves to protect the energy store 4 accommodated in the energy store housing 3 from mechanical loads and any damage resulting therefrom, in particular in the event of stress such as, for example, accidents. The underride guard 5 also serves to ensure that, in the event of a collision of the motor vehicle 1 with an object, in particular with another motor vehicle, a pedestrian, or an animal, the object is not overrun by the motor vehicle 1, which means that serious injuries can be avoided. Because the underride guard 5 is not monolithic or in one piece, in particular as a metal sheet, as in previous systems, but instead comprises the sandwich arrangement 10 having the webs or ribs 14, this increases the flexural strength of the underride guard 5 and the energy store arrangement 2. This optimization of the topology of the underride guard 5 consequently results in improved energy absorption in the event of sudden load cases, in particular in the event of crashes or accidents.

As can be seen in particular from FIG. 2, the underride guard 5 is fixed in the region of the webs or ribs 14 to the reinforcing elements 9 designed as carriers 8. Furthermore, the underride guard 5 is fixed to the two lateral webs or ribs 14 thereof (not shown in FIG. 2), on the side walls 21 of the energy store housing 3. The longitudinal axes of the respective webs or ribs 14 run parallel to the longitudinal axes of the respective associated carriers 8 or side walls 21. This brings about improved support of the underride guard 5 on the carriers 8 or the wall structure of the energy store housing 3. These adapted topologies of the underride guard 5 and the energy store housing 3 have the effect that when force is applied to the underride guard 5, in particular in the event of a crash, forces acting in this case are transferred as efficiently as possible to the structure of the reinforcing elements 9. The energy released in the crash is thus absorbed as optimally as possible by the energy store arrangement 2.

The underride guard 5 is fixed to the carriers 8 by way of example using a plurality of screws 15. For this purpose, the screws 15 penetrate the sandwich arrangement 10 and are fixed to the carriers 8. The carriers 8, which can be designed as solid or hollow profiles, have a plurality of bores for this purpose, each provided with a thread, into which the corresponding screws 15 engage. Furthermore, the sandwich arrangement 10, i.e. the cover plates 11, 12 and the filling material 13 and the base plate 6 also have corresponding holes or bores for the screws 15. The fixing of the underride guard 5 by means of the lateral webs or ribs 14 on the side walls 21 of the energy store housing 3 takes place according to the same principle as the fixing of the underride guard 5 to the carriers 8.

The lower cover plate 12, designed as a flat plate in the central region thereof, has a plurality of screw-on points 16 arranged along the webs or ribs 14 or carriers 8, which can be provided as cylindrical or conical countersunk holes or the like, for example, to avoid protrusions of the heads of the screws 15. The underride guard 5 is therefore completely held by the screws 15 on the energy store housing 3.

The motor vehicle 1 according to an embodiment of the invention also has, by way of example, a cooling system or a cooling circuit in which a cooling fluid circulates, wherein a plurality of cooling devices 18, through which the cooling fluid flows, is provided and comprises cooling plates 17. The energy stores 4 typically heat up, in particular during the driving or charging operation of the motor vehicle 1, the heat generated in this case being dissipated by the cooling devices 18. The cooling plates 17 are in thermal contact with the, in particular metallic, base plate 6, which in turn is in thermal contact with the energy stores 4. The cooling devices 18 comprising a plurality of cooling plates 17 are each arranged between two webs or ribs 14 of the sandwich arrangement 10 and extend over as large a region as possible, in particular more than two thirds of the distance between these two webs or ribs 14. The cooling devices 18 are integrated into the cooling system via lines carrying the cooling fluid, these lines (not shown) preferably being guided out of the sandwich arrangement 10 laterally or downwards; for this purpose, it is possible for the sandwich arrangement 10 to have corresponding openings or recesses through which the lines are guided.

The cooling plates 17 can, for example, be fixed to the housing base 6 of the energy store housing 3 with further screws (not shown). In addition, the cooling plates 17 are arranged at a distance from the sandwich arrangement 10, i.e. a thermally insulating air layer or an air cushion 19 remains between the cooling plates 17 and the sandwich arrangement 10. The distance between the cooling plates 17 and the sandwich arrangement 10 is equally constant since the sandwich arrangement 10 between the webs or ribs 14 has a constant height in each case. However, it is also possible for the sandwich arrangement 10 to be designed so as to be curved, i.e. in the manner of a bridge, in the regions between two webs or ribs 14.

The filling material 13 is explained in more detail below. In the embodiment shown, the filling material 13 is designed as a filling foam, hence as a thermal insulation material. The filling material 13 can consist of polyethylene terephthalate, polyurethane, or polymethacrylimide. It can either be originally formed or provided as sheet material, it being possible to produce recesses into the filling material 13, for example for screw heads of the cooling plates 17 or the like, by overpressing. The filling material 13 therefore not only serves to increase the mechanical stability of the energy store housing assembly 2, but also serves, in addition to the air cushion 19, as thermal insulation for the energy store 4 and for the cooling plates 17. It is particularly disadvantageous at high outside temperatures if the cooling power provided by the cooling device 18 is lost to the outside via the underride guard 5, which was previously solved by, for example, spacers designed as separate components between the energy store housing 3 and the underride guard 5 having a low thermal conductivity. Components of this type are therefore no longer required in the present invention.

The upper cover plate 11 and the lower cover plate 12 consist of a fiber-reinforced plastics material. As an example, fibers made of glass and/or carbon and/or natural fibers are used in this case, which are present in the form of textile semi-finished products such as, for example, woven fabrics or the like.

It can be seen from FIG. 3 that the filling material 13 is only provided in the region of the sandwich arrangement 10 which is adjacent to the energy store housing 3. In the region 20 of the sandwich arrangement 10 protruding laterally beyond the energy store housing 3, the upper cover plate 11 is fixed directly to the lower cover plate 12. In particular, the thermally insulating effect of the filling material 13 is no longer required in this region, which is why the sandwich arrangement 10 can have a correspondingly simplified structure in the lateral regions 20 thereof.

The invention claimed is:

1. An energy store housing assembly for a motor vehicle, the energy store housing assembly comprising:
   an energy store housing including:
      a base plate defining a bottom side of the energy store housing,
      a plurality of side walls extending from the base plate to a top side of the energy store housing, and
      a plurality of reinforcing elements disposed within the energy store housing, wherein at least one of the plurality of reinforcing elements includes a carrier that extends along the base plate and between a pair of opposing side walls; and
   an underride guard coupled to the base plate of the energy store housing, wherein the underride guard comprises a sandwich arrangement including:
      an upper cover plate defining a top side of the sandwich arrangement facing the energy store housing,
      a lower cover plate defining a bottom side of the sandwich arrangement, and
      a filling material disposed between the upper cover plate and the lower cover plate;
   wherein the upper cover plate comprises a plurality of ribs extending along the top side of the sandwich arrangement, and
   wherein the plurality of ribs are coupled to the plurality of reinforcing elements.

2. The energy store housing assembly according to claim 1, further comprising:

a plurality of fasteners extending through the sandwich arrangement of the underride guard and the base plate of the energy store housing and into the carrier,
wherein the plurality of fasteners include at least one of a screw, a socket, or a rivet.

3. The energy store housing assembly according to claim 1, further comprising:
a cooling device disposed between the underride guard and the energy store housing,
wherein the cooling device is in thermal contact with an energy store accommodated in the energy store housing, and the cooling device comprises a cooling plate.

4. The energy store housing assembly according to claim 3, wherein the cooling device is disposed between two ribs and extends at least over half of a spacing between the two ribs.

5. The energy store housing assembly according to claim 1, wherein the filling material comprises a thermal insulation material.

6. The energy store housing assembly according to claim 5, wherein the thermal insulation material comprises a filling foam.

7. The energy store housing assembly according to claim 1, wherein the upper cover plate comprises at least one of a plastic material or a fiber-reinforced material.

8. The energy store housing assembly according to claim 1, wherein the lower cover plate comprises at least one of a plastic material or a fiber-reinforced material.

9. The energy store housing assembly according to claim 1, wherein the upper cover plate and the lower cover plate protrude laterally beyond the energy store housing such that a first region of the sandwich arrangement is disposed adjacent to the energy store housing and a second region of the sandwich arrangement is disposed laterally beyond the energy store housing, and
wherein the filling material is disposed only in the first region of the sandwich arrangement adjacent to the energy store housing, and the upper cover plate contacts the lower cover plate in the second region of the sandwich arrangement.

10. An underride guard coupled to a bottom side of an energy store housing assembly, the underride guard comprising:
a sandwich arrangement including:
an upper cover plate defining a top side of the sandwich arrangement facing the energy store housing,
a lower cover plate defining a bottom side of the sandwich arrangement, and
a filling material disposed between the upper cover plate and the lower cover plate;
wherein the upper cover plate comprises a plurality of ribs extending along the top side of the sandwich arrangement,
wherein the upper cover plate and the lower cover plate protrude laterally beyond the energy store housing such that a first region of the sandwich arrangement is disposed adjacent to the energy store housing and a second region of the sandwich arrangement is disposed laterally beyond the energy store housing, and
wherein the filling material is disposed only in the first region of the sandwich arrangement adjacent to the energy store housing, and the upper cover plate contacts the lower cover plate in the second region of the sandwich arrangement.

11. The underride guard according to claim 10, wherein the filling material comprises a thermal insulation material.

12. The underride guard according to claim 11, wherein the thermal insulation material comprises a filling foam.

13. The underride guard according to claim 10, wherein the upper cover plate comprises at least one of a plastic material or a fiber-reinforced material.

14. The underride guard according to claim 10, wherein the lower cover plate comprises at least one of a plastic material and a fiber-reinforced material.

15. A motor vehicle comprising:
an energy store housing assembly including:
an energy store housing including:
a base plate defining a bottom side of the energy store housing, and
a carrier that extends along the base plate;
an underride guard coupled to the base plate of the energy store housing, wherein the underride guard comprises a sandwich arrangement including:
an upper cover plate defining a top side of the sandwich arrangement facing the energy store housing, the upper cover plate comprising a plurality of ribs extending along the top side of the sandwich arrangement,
a lower cover plate defining a bottom side of the sandwich arrangement, and
a filling material disposed between the upper cover plate and the lower cover plate; and
a plurality of fasteners extending through the sandwich arrangement of the underride guard and the base plate of the energy store housing and into the carrier of the energy store housing, wherein the plurality of fasteners include at least one of a screw, a socket, or a rivet.

\* \* \* \* \*